United States Patent
Tillotson

(10) Patent No.: US 10,611,458 B2
(45) Date of Patent: Apr. 7, 2020

(54) AIRCRAFT CABIN NOISE REDUCTION SYSTEMS AND METHODS

(71) Applicant: The Boeing Company, Chicago, IL (US)

(72) Inventor: Brian J. Tillotson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 15/591,002

(22) Filed: May 9, 2017

(65) Prior Publication Data

US 2018/0327076 A1   Nov. 15, 2018

(51) Int. Cl.
| | |
|---|---|
| *B64C 1/40* | (2006.01) |
| *B64C 21/02* | (2006.01) |
| *B64C 9/38* | (2006.01) |
| *B64C 3/00* | (2006.01) |
| *B64D 13/08* | (2006.01) |
| *B64D 27/02* | (2006.01) |

(52) U.S. Cl.
CPC ............. *B64C 1/40* (2013.01); *B64C 3/00* (2013.01); *B64C 9/38* (2013.01); *B64C 21/02* (2013.01); *B64D 13/08* (2013.01); *B64D 27/02* (2013.01); *B64C 2220/00* (2013.01); *B64C 2230/10* (2013.01); *B64C 2230/14* (2013.01); *B64C 2230/22* (2013.01)

(58) Field of Classification Search
CPC .... B64C 1/40; B64C 3/00; B64C 9/38; B64C 21/02; B64C 2220/00; B64C 2230/14; B64C 1/38; B64C 2230/10; B64C 2230/22; B64C 21/00; B64D 13/006
See application file for complete search history.

(56) References Cited

U.S. PATENT DOCUMENTS

| | | | |
|---|---|---|---|
| 2,928,627 A | 3/1960 | Johnson | |
| 5,348,256 A | 9/1994 | Parikh | |
| 8,981,261 B1 | 3/2015 | Tillotson | |
| 2003/0150955 A1 | 8/2003 | Daggett | |
| 2006/0000943 A1* | 1/2006 | Ouellette | ................. B64C 9/38 244/35 R |

FOREIGN PATENT DOCUMENTS

GB   790298   2/1958

\* cited by examiner

*Primary Examiner* — Nicholas McFall
*Assistant Examiner* — Terri L Filosi
(74) *Attorney, Agent, or Firm* — Haynes and Boone, LLP

(57) ABSTRACT

Systems and methods according to one or more embodiments are provided for reducing noise levels in a passenger cabin of an aircraft. In one example, an aircraft includes a wing coupled to a fuselage. The wing is configured to heat air to provide a first stream of air from a central portion of a wing segment of the wing extending between the fuselage and a first engine of an aircraft. The first stream of air is at a higher temperature than an adjacent stream of air from the wing.

20 Claims, 12 Drawing Sheets

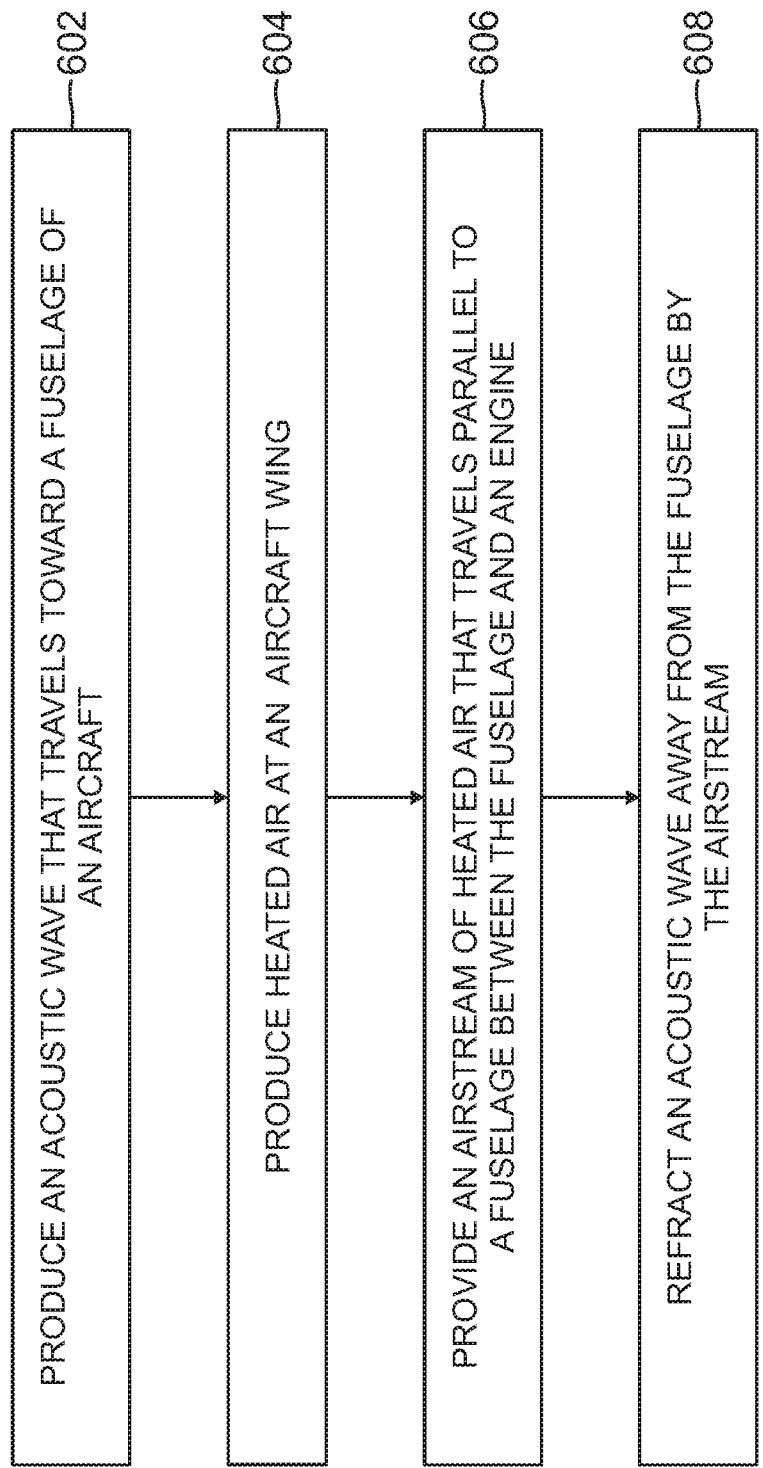

AIRCRAFT CABIN NOISE REDUCTION SYSTEMS AND METHODS

TECHNICAL FIELD

One or more embodiments relate generally to aircraft systems, and more particularly, for example, to techniques for reducing aircraft cabin noise.

BACKGROUND

In the field of air passenger and flight crew comfort, there is an ongoing effort to reduce noise levels in an aircraft cabin during flight. For example, loud noise caused by an engine and its exhaust stream makes air travel unpleasant and tiring, particularly in the aft portion of the cabin. Sound waves produced by the engine and its exhaust stream increases noise levels in the cabin, particularly during takeoff and ascent. Thus, there is a need for aircraft cabin noise reduction techniques.

SUMMARY

Systems and methods are disclosed herein in accordance with one or more embodiments that provide techniques to reducing noise levels in an aircraft. In various embodiments, an aircraft cabin noise reduction system is implemented as a heated stream of air from a wing of an aircraft to form, for example, a heated air temperature gradient to refract noise, created by an aircraft engine and its exhaust stream of air, away from (e.g., around or divert) an aircraft cabin.

In one example, a heated stream of air is produced at a leading edge of an aircraft wing by heating the leading edge of the wing using electrical heaters. The leading edge is heated at a central portion of a wing segment extending between the fuselage and the engine. Ambient air is heated as it passes around the heated leading edge to produce a heated stream of air. The heated stream of air travels from the wing in an aft direction parallel to the fuselage to form a temperature gradient of heated air between an engine exhaust stream of air and the fuselage.

In another example, heated bleed air produced by an aircraft engine is routed within an interior chamber of the wing. A plurality of ports discharge the heated bleed air at a central portion of a wing segment extending between the fuselage and the engine to produce the heated stream of air.

In one embodiment, a method includes heating air to provide a first stream of air from a central portion of a wing segment of a wing extending between a fuselage and a first engine of an aircraft; and wherein the first stream of air is at a higher temperature than an adjacent stream of air from the wing.

In another embodiment, an aircraft includes a fuselage; a wing coupled to the fuselage and configured to heat air to provide a first stream of air from a central portion of a wing segment of a wing extending between a fuselage and a first engine of an aircraft; and wherein the first stream of air is at a higher temperature than an adjacent stream of air from the wing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6 illustrates a flow diagram describing a method for using an aircraft cabin noise reduction system in accordance with an embodiment of the disclosure.

DETAILED DESCRIPTION

Systems and methods are provided in accord with one or more embodiments that reduce noise levels in an aircraft (e.g., a passenger cabin). In various embodiments, an aircraft cabin noise reduction system is implemented as a heated stream of air that travels from a central portion of a wing segment of a wing extending between a fuselage and an inboard engine of an aircraft. Acoustic noise waves generated by the inboard engine and an engine exhaust stream of air travel toward an aft portion of the fuselage at a passenger cabin. The noise produced by the engine and the engine exhaust increases noise levels in the cabin, particularly during takeoff and ascent. The heated stream of air travels in an aft direction parallel to the fuselage between the engine and the fuselage. As the acoustic noise wave encounters the heated stream of air, it is refracted away from the fuselage at the passenger cabin.

The aircraft cabin noise reduction system utilizes systems of the aircraft to produce a heated stream of air. In some embodiments, electrical heaters mounted to a leading edge of the aircraft wing between the fuselage and the inboard engine heats the leading edge of the wing. Ambient air flowing over the wing is heated by the leading edge to produce the heated stream of air. In some embodiments, hot compressed bleed air from the engine is routed to an interior chamber of the wing and is discharged through ports located on a top or bottom surface of the wing to produce the heated stream of air.

Figure 1:
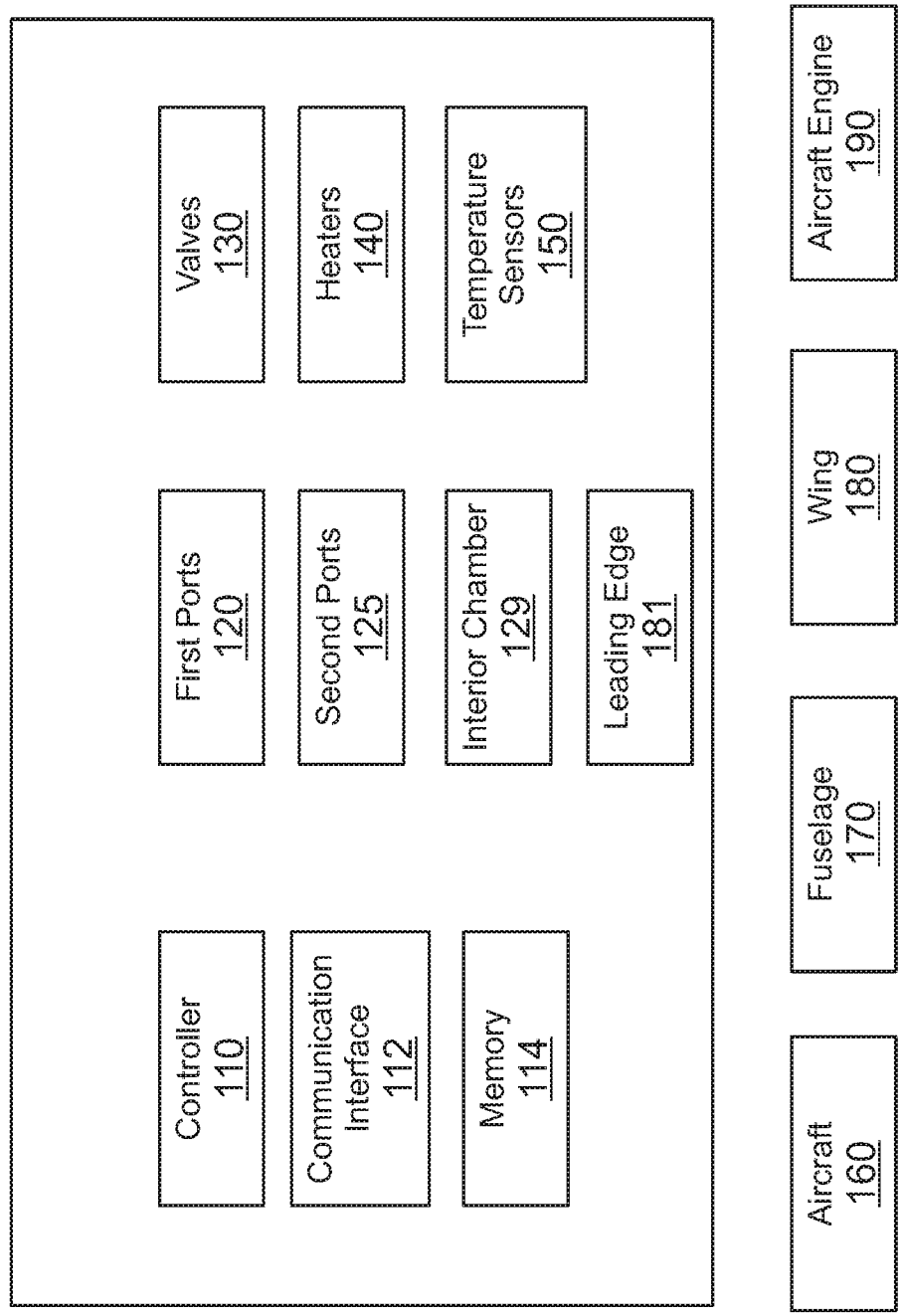
FIG. 1 illustrates a diagram of an aircraft cabin noise reduction system in accordance with one or more embodiments of the disclosure.

FIG. 1 illustrates a diagram of an aircraft cabin noise reduction system 100 in accordance with an embodiment of the disclosure. An aircraft 160 includes a fuselage 170, a wing 180 coupled to fuselage 170, an aircraft engine 190 coupled to wing 180, and aircraft cabin noise reduction system 100.

Aircraft cabin noise reduction system 100 provides for a capability to reduce noise levels in an aircraft. It will be appreciated, that aircraft cabin noise reduction system 100 may be implemented in various embodiments, as discussed herein.

In some embodiments, noise reduction system 100 is implemented to produce a heated stream of air using hot bleed air from aircraft engine 190. Hot bleed air is routed to an interior chamber 129 of wing 180 and is discharged through first ports 120 coupled to interior chamber 129. First ports 120 are selectively distributed within a central portion of a wing segment of wing 180 extending between fuselage 170 and engine 190 to provide a heated stream of air between fuselage 170 and engine 190. In this regard, the heated stream of air travels from the wing in an aft direction in a path parallel to the fuselage to form a heated air temperature gradient between an engine exhaust stream of air and the fuselage when the aircraft is moving forward through the ambient air 315.

Optionally, second ports 125 are provided to discharge air at a lower temperature or lower flow rate than heated stream of air discharged through first ports 120. Second ports 125 are selectively distributed within one or more outer portions of a wing segment of wing 180 extending between fuselage 170 and engine 190.

In some embodiments, heated air is produced by aircraft engine 190, for example, as hot compressed bleed air (e.g., engine heated air) and is conducted from aircraft engine 190 to interior chamber 129. Interior chamber 129 extends along wing 180 from fuselage 170 to engine and directs heated air toward first ports 120.

In some embodiments, one or more valves 130 are coupled between engine 190 and interior chamber 129 to selectively route engine heated air to interior chamber 129. A controller 110 is electrically connected to valves 130. Controller 110 controls opening and closing the one or more valves 130 to selectively route engine heated air to interior chamber 129.

In other embodiments, noise reduction system 100 is implemented to produce a heated stream of air using one or more electrical heaters 140 coupled to interior chamber 129 to heat air within interior chamber 129. Heater 140 is selectively located within wing 180 to heat air within interior chamber 129 in a vicinity of one or more first ports 120. In various embodiments, heater 140 is an electrical resistance heater, however, other types of heaters are possible. In some embodiments, heater 140 includes a fixed wattage output power. In other embodiments, heater 140 includes a variable wattage output power. Controller 110 is electrically connected to heater 140 to turn on and turn off heater 140. In some embodiments, controller 110 adjusts the wattage output power of heaters 140 using variable wattage output settings.

In yet another embodiment, heater 140 is mechanically coupled to a leading edge 181 of wing 180 to heat an exterior surface of leading edge 181. In some embodiments, heater 140 is implemented as a heating blanket that is bonded to an exterior surface of leading edge 181 of wing 180 at the central portion of the wing segment between engine 190 and fuselage 170. Heating blanket 140 heats the exterior surface of leading edge 181 at the central portion. Ambient air is heated as it contacts leading edge 181 to produce a heated stream of air. The heated stream of air passes over an upper and/or a lower surface at the central portion of wing 180 extending between fuselage 170 and engine 190. The heated stream of air travels from the wing in an aft direction in a path along (e.g., approximately parallel) to the fuselage to form a heated air temperature disturbance between an engine exhaust stream of air and the fuselage.

Controller 110 performs operations to control valves 130 or heaters 140, as discussed herein. In various embodiments, controller 110 is electrically connected to valves 130 to selectively open and close valves 130 to control a flow of engine heated air to interior chamber 129. Controller 110 is electrically connected to one or more heaters 140 to control heater output power. Controller 110 receives an electrical signal (e.g., a sensor signal) from a temperature sensor 150 coupled to interior chamber 129 and converts the electrical signal to a temperature signal (e.g., sensor data). Controller 110 adjusts heater 140 output power to vary a temperature of air inside interior chamber 129 based on the temperature signal.

Controller 110 includes, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Controller 110 is adapted to interface and communicate with components 114, 130, 140, and 150 via a communication interface 112 to perform method and processing steps as described herein. Communication interface 112 includes wired or wireless communication buses within aircraft 160.

In various embodiments, it should be appreciated that processing operations and/or instructions are integrated in software and/or hardware as part of controller 110, or code (e.g., software or configuration data) which is stored in a memory 114. Embodiments of processing operations and/or instructions disclosed herein are stored by a machine readable medium in a non-transitory manner (e.g., a memory, a hard drive, a compact disk, a digital video disk, or a flash memory) to be executed by a computer (e.g., logic or processor-based system) to perform various methods disclosed herein. In various embodiments, the machine readable medium is included as part of controller 110.

Memory 114 includes, in one embodiment, one or more memory devices (e.g., one or more memories) to store data and information. The one or more memory devices includes various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, controller 110 is adapted to execute software stored in memory 114 to perform various methods, processes, and operations in a manner as described herein.

Aircraft cabin noise reduction system 100, in some embodiments, incudes temperature sensors 150. Temperature sensors 150 provide for sensing temperature of heated air within interior chamber 129 produced by heater 140 and/or engine 190. Temperature sensors 150 also provide for sensing temperature of exterior surface of leading edge 181, for some embodiments. Controller 110 is adapted to receive sensor signals from temperature sensors 150, process temperature sensor signals into temperature sensor data, store temperature sensor data in memory 114, and/or retrieve stored temperature sensor data from memory 114. In various aspects, temperature sensors are remotely positioned within interior chamber 129 and exterior surface of leading edge 181. Controller 110 is adapted to remotely receive temperature sensor signals via wired or wireless communication interface 112 within aircraft 160.

Figure 2:
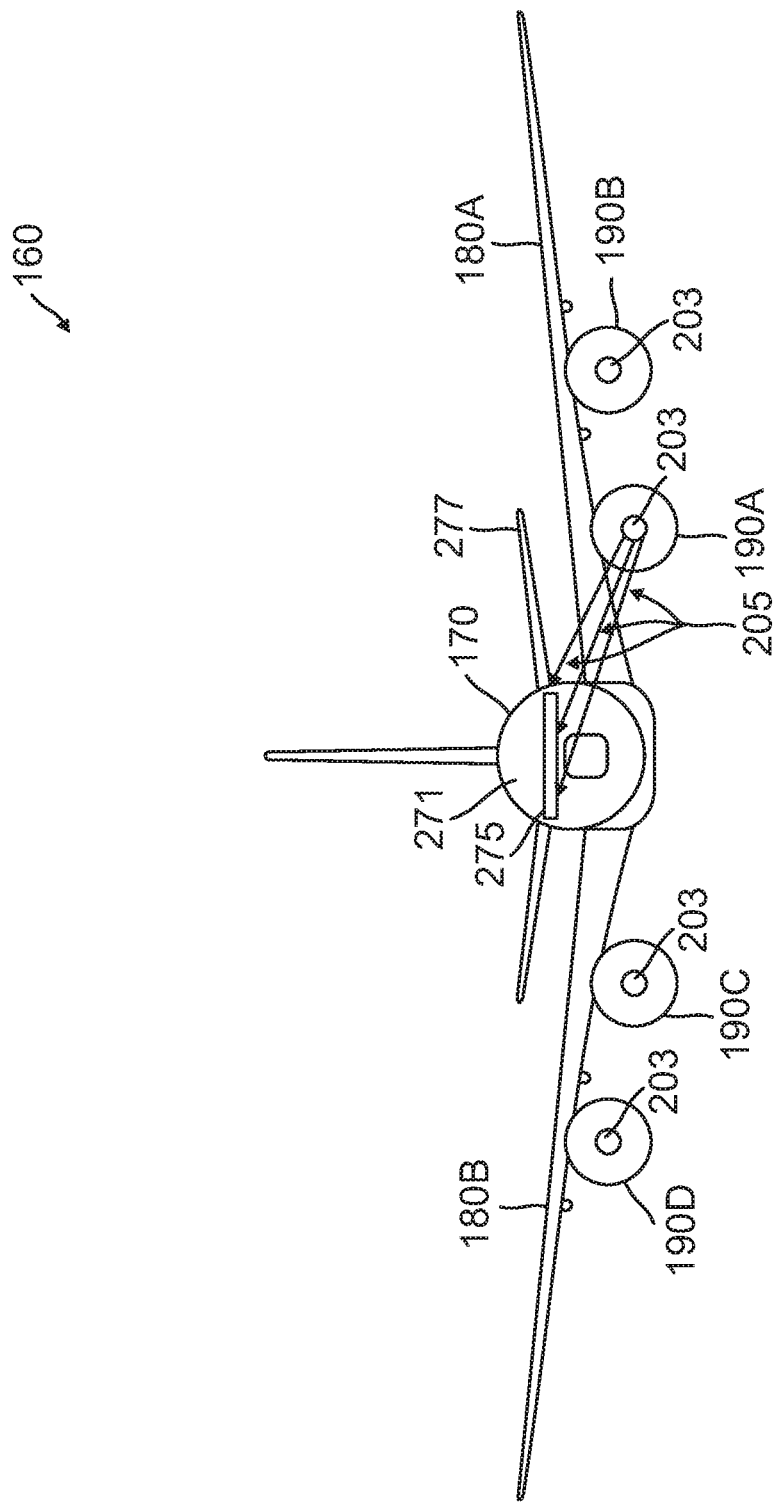
FIG. 2 illustrates a sound path of an aircraft engine high-speed exhaust noise toward an aircraft cabin in accordance with an embodiment of the disclosure.

FIG. 2 illustrates a sound path of an aircraft engine 190 high-speed exhaust noise toward an aircraft cabin in accordance with an embodiment of the disclosure. FIG. 2 illustrates a front view of aircraft 160. As shown in FIG. 2, engine exhaust high-speed air 203 is produced by engines 190 (labeled 190A-D). High-speed air 203 flows parallel to fuselage 170 in an aft direction toward aircraft 160 tail section 277. As high-speed air 203 moves past slower moving air, it creates a disturbance that produces acoustic noise waves 205. Acoustic noise waves 205 travels in a direction approximately perpendicular to an aft portion of fuselage 170 toward passenger cabin 271 of aircraft 160.

The effect of acoustic waves 205 on passenger cabin 271 may be better understood with consideration of the diagram in FIG. 2. FIG. 2 illustrates the path of acoustic noise waves 205 (e.g., sound waves) as waves 205 travel from the engine exhaust high-speed air 203 toward a passenger ear zone 275 within passenger cabin 271. Noise levels are higher in the aft portion of passenger cabin 271, behind inboard aircraft engine 190A mounted to wing 180A. Typically, noise entering cabin 271 is higher in decibel level during aircraft takeoff and ascent.

In conventional aircraft systems, a uniform stream of heated air may be produced by aircraft 160 (e.g., produced by conventional deicing systems associated with the wing) between fuselage 170 and engine 190A. The uniform stream of heated air flows in an aft direction toward aircraft 160 tail section 277 in a path parallel to fuselage 170 between fuselage 170 and engine 190A. Acoustic noise waves 205 travel through the uniform stream of heated air and continue on a path unchanged in direction toward passenger cabin 271, providing no acoustic benefit.

In some embodiments, aircraft 160 includes an additional outboard aircraft engine 190B mounted to wing 180A that discharges high-speed air 203 to produce acoustic noise waves 205. Furthermore, aircraft 160 includes engines 190C-D mounted to wing 180B that additionally increase noise levels entering cabin 271.

Figure 3:
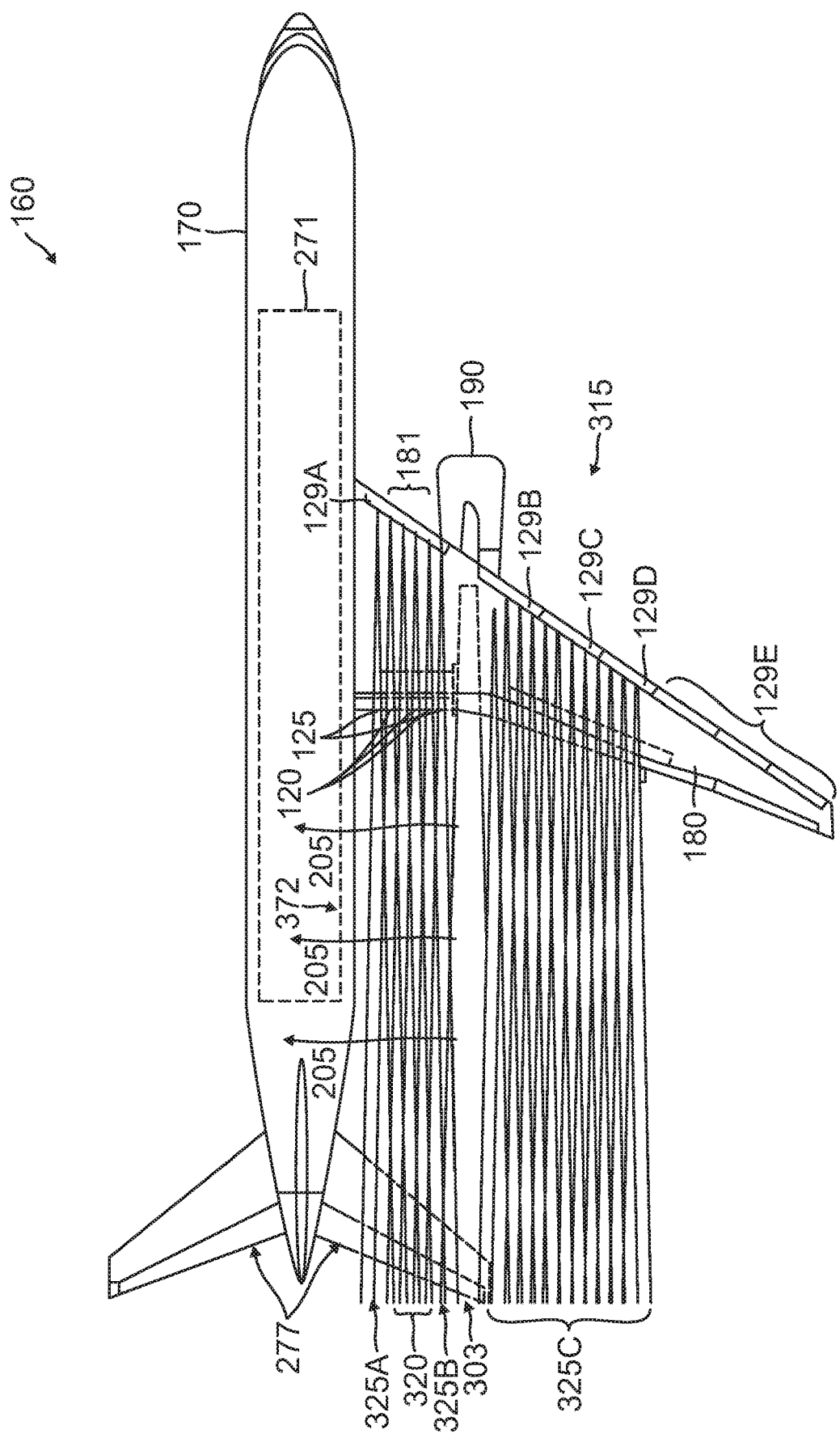
FIG. 3 illustrates an airstream of engine exhaust high-speed air from an aircraft engine and airstreams from a wing of an aircraft in accordance with an embodiment of the disclosure.

FIG. 3 illustrates an airstream of engine exhaust high-speed air 303 from an aircraft engine 190, and airstreams 320, and 325A-C from a wing 180 of an aircraft 160 in accordance with an embodiment of the disclosure. As shown in FIG. 3, an engine exhaust stream of air 303 produced by engine exhaust 203, and airstream 320, and airstreams 325A-C, and ambient air 315 flow in an aft direction in a path parallel to fuselage 170 along an aft section 372 from wing 180 to tail section 277.

In some embodiments, airstream 320 is produced by discharged hot bleed air from first ports 120, and airstreams 325A-C is produced by discharged ambient air from second ports 125, at a temperature lower than airstream 320. In other embodiments, airstream 320 is produced by heating ambient air as it travels around and contacts an exterior surface of heated leading edge 181.

In various embodiments, second ports 125 discharge heated air at about the same temperature as first ports 120. In some embodiments, second ports 125 have smaller orifices than first ports 120, so air flows out through each port 125 at lower volumetric rate than through each port 120. Therefore, the mixed airstream behind the outer portion of the wing segment (said mixed airstream incorporating air from ports 125 mixed with ambient air) has lower average temperature than the mixed airstream behind the central portion of the wing segment (said mixed airstream incorporating air from ports 120 with ambient air). In some embodiments, second ports 125 are distributed with greater spanwise distance between them than first ports 120. Therefore, the mixed airstream behind the outer portion of the wing segment has a relatively lower fraction of heated air and a relatively higher fraction of ambient air than the mixed airstream behind the central portion of the wing segment. The mixed airstream behind the outer portion of the wing segment therefore has a lower average temperature than the mixed airstream behind the central portion of the wing segment.

By controlling a temperature and/or a density of airstream 320 at a temperature higher than airstreams 325A-B, a temperature gradient comprising discharged heated air is created. In this regard, the set of airstreams 325A, 320, and 325B traveling parallel to fuselage 170 between fuselage 170 and engine 190 provide for a heated air temperature disturbance to effectively refract acoustic noise waves 205 away from aft section 372 of fuselage 170 to reduce noise levels in passenger cabin 271. Specifically, the acoustic path length through airstream 320 situated adjacent to airstreams 325A and/or 325B is shorter than the acoustic path length through airstreams 325A-B. The acoustic path length is given by the integral of the geometric path length (e.g., the physical path length) multiplied by the reciprocal of the speed of sound in the medium (e.g., the index of refraction) such as, for example, air at an altitude of aircraft 160. As acoustic waves 205 travel through airstreams 325 and 320, the difference in acoustic path length causes acoustic wave 205 to divert or refract outward (e.g., or to vertically diverge) as it travels through airstream 320. A uniform stream of air, such as airstream 325C, will not refract acoustic waves 205 as airstream 325C is a uniform temperature and/or density along wing segments 129B-E of wing 160.

Figure 4A:
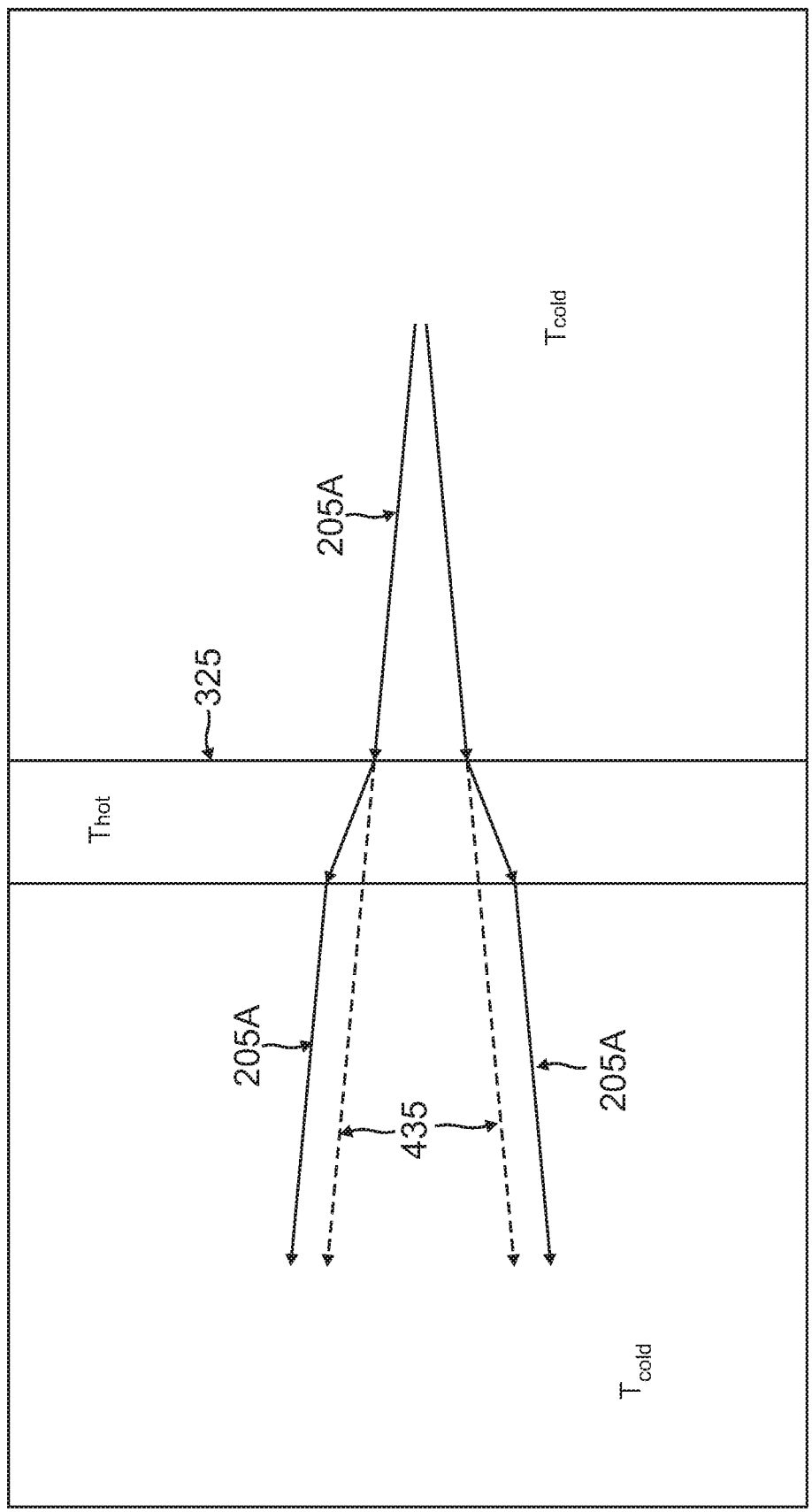
FIGS. 4A-F illustrate acoustic noise waves traveling through temperature gradients in accordance with embodiments of the disclosure.
Figure 4B:
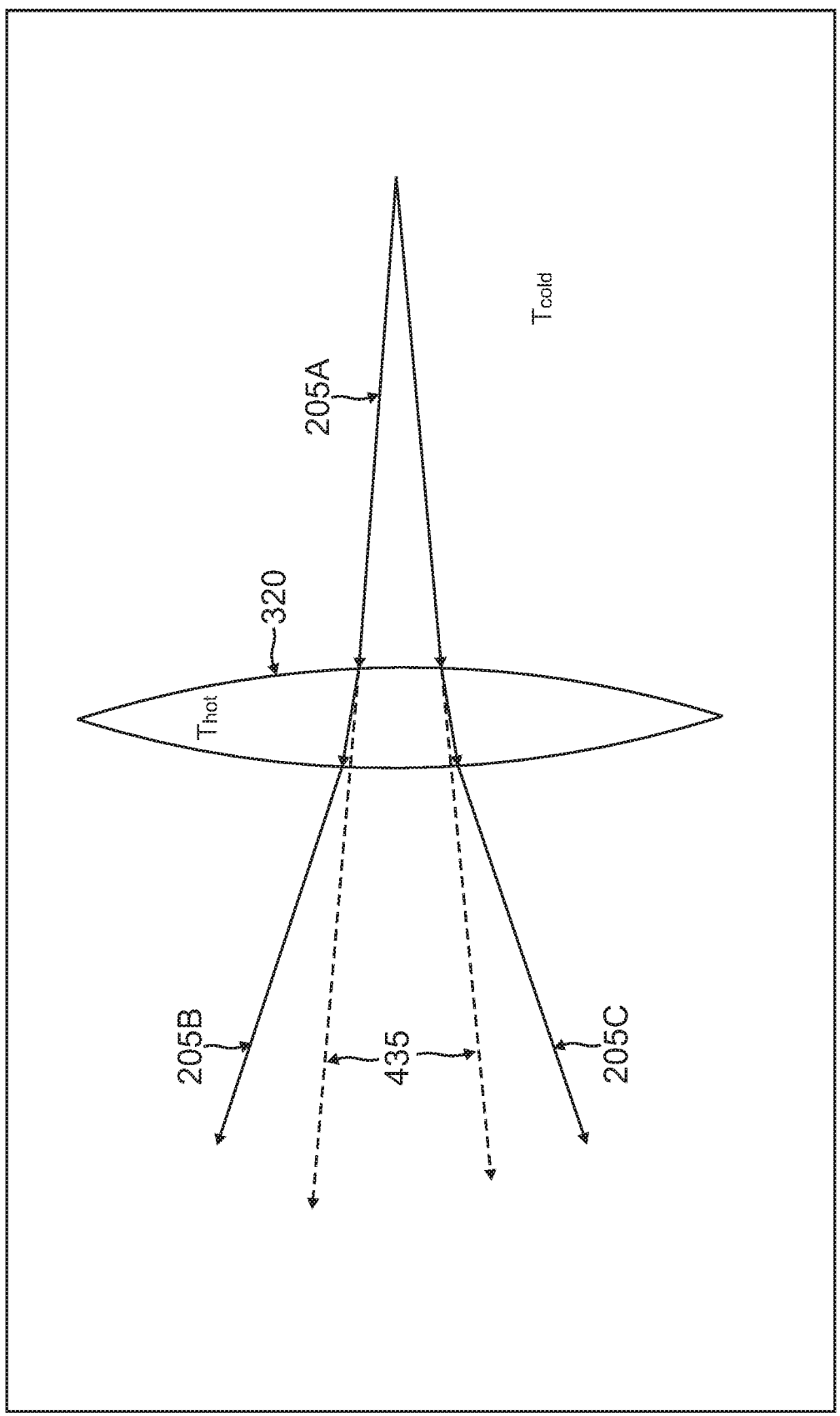

For example, FIGS. 4A-F illustrate acoustic noise waves 205 traveling through temperature gradients in accordance with embodiments of the disclosure. As shown in FIGS. 4A-B, a path of acoustic noise waves 205 traveling through a hot region of uniform thickness and temperature such as airstream 325 remains unchanged in direction and only slightly offset laterally from original path 435 after waves 205 travel through airstream 325. Conversely, a path of acoustic noise waves 205 traveling through a convex hot region such as airstream 320 diverges. In this regard, as acoustic noise waves 205 travels from a colder region to a convex hotter region of air, waves 205 are diverted by the cold-to-hot temperature transition. The speed of sound through a gaseous media (e.g., such as air) is approximately proportional to the square root of absolute temperature and as the temperature increases, waves 205 travel faster. Thus, acoustic waves crossing an interface between gaseous regions of different temperatures are refracted, just as light waves crossing an interface between regions where the local speed of light differs are refracted in accordance with Snell's law.

As shown in FIG. 4A, acoustic wave 205A travels from a colder temperature region of gases Tcold to a hotter region of gases, shown as airstream 325. Acoustic wave 205A is diverted some angular distance in one direction when it enters the hotter region of gases. It is diverted by the same angular distance in the other direction when it exits the hotter region and returns to the colder region. In this regard, acoustic wave 205A travels through region Thot of airstream 325, and exits airstream 325 and continues on a path unchanged in direction. Thus, no acoustic benefit is provided by airstream 325 alone.

In FIG. 4B, acoustic wave 205A travels from a cooler region Tcold (e.g., such as ambient air 315) to convex hotter region airstream 320, and exits airstream 320 refracted into two divergent waves 205B and 205C. In this regard, a convex region of hotter gases Thot causes acoustic waves 205 to diverge relative to their original paths 435. Thus, convex airstream 320 at a temperature greater than ambient air 315 produces a temperature gradient necessary to refract acoustic waves 205 away from fuselage 170 and away from (e.g., around or divert) aircraft passenger cabin 271.

Figure 4C:
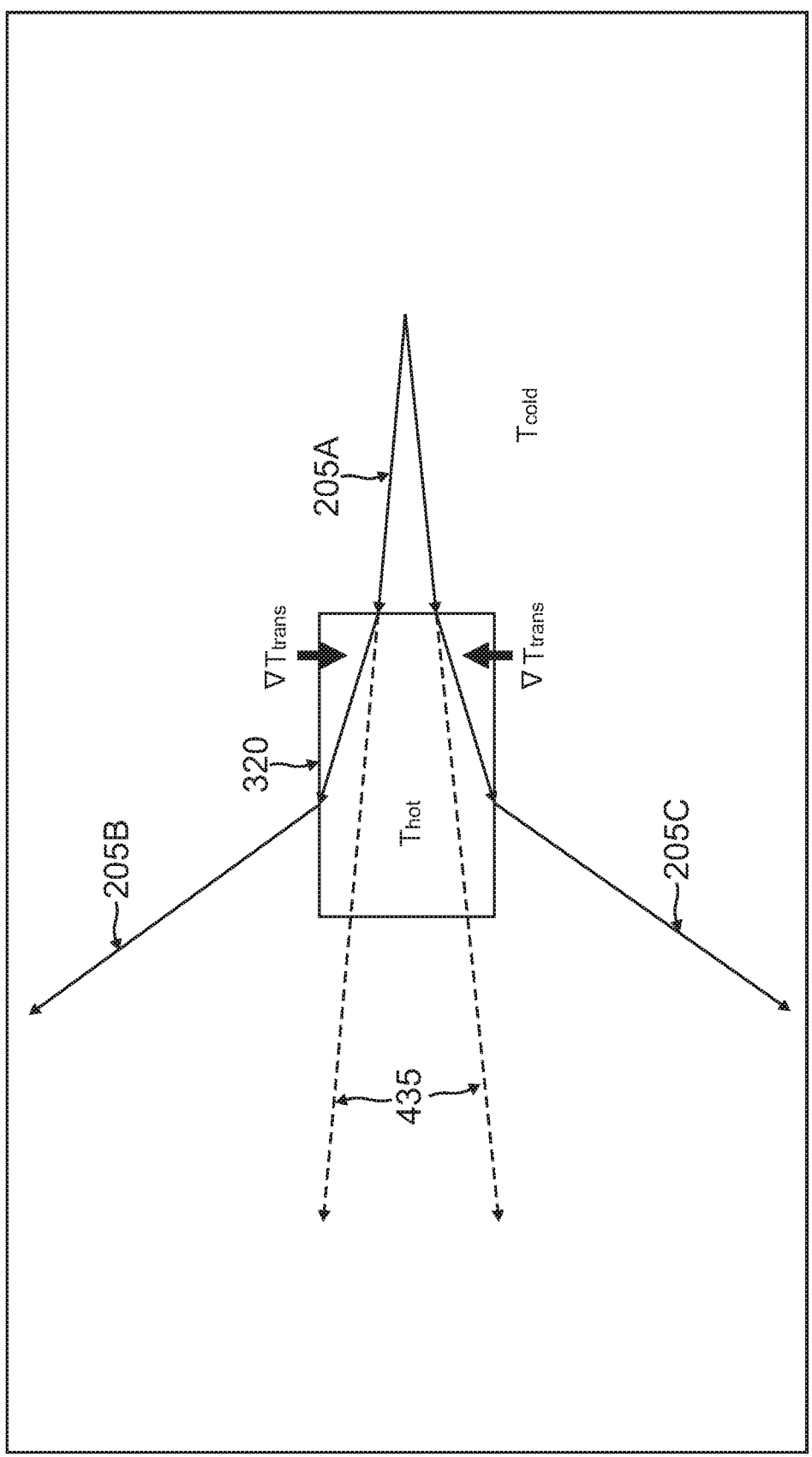

Persons skilled in the art will appreciate that creating a lenticular heated airstream, such as airstream 320 in FIG. 4B, may require complex and costly systems. FIG. 4C (not to scale) illustrates a convex heated airstream 320 with rectangular cross-section, which may be more easily produced by air ejected from ports 120. Acoustic wave 205A travels from a cooler region Tcold to convex hotter region airstream 320. As in FIGS. 4A-B, acoustic wave 205A is diverted in one angular direction at the cold-to-hot transition into airstream 320. When acoustic wave 205A exits airstream 320, it encounters thermal gradient ∇Ttrans oriented transverse to the travel direction of acoustic wave 205A (e.g., an orientation of the thermal gradient ∇Ttrans at each location is indicated by the thick black arrows). Acoustic wave 205A is diverted further in the same angular direction when it exits airstream 320 as when it entered airstream 320 because of this thermal gradient. Thus, acoustic wave 205A is refracted into two divergent waves 205B and 205C. In this regard, a convex region of hotter gases Thot causes acoustic waves 205 to diverge relative to their original paths 435. Thus, convex airstream 320, at a temperature greater than ambient air 315, produces a temperature gradient necessary to refract acoustic waves 205 away from fuselage 170 and away from (e.g., around or divert) aircraft passenger cabin 271.

Figure 4D:
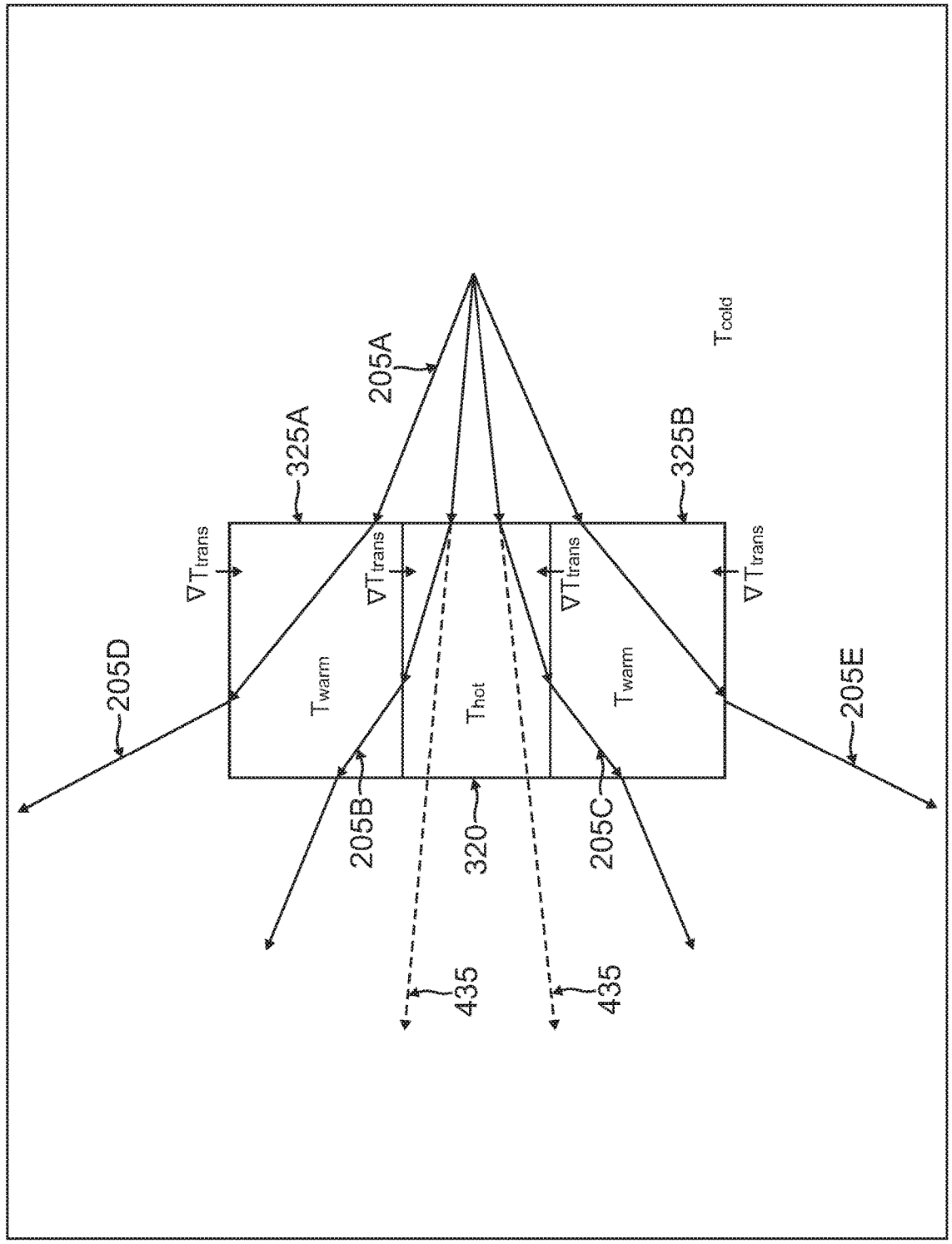

FIG. 4D illustrates a convex heated airstream comprising hot airstream 320 and adjoining warm airstreams 325A and 325B. Acoustic wave 205A travels from a cooler region Tcold to convex hotter region airstream 320. As in FIG. 4C, each acoustic wave 205A is diverted in one angular direction at the cold-to-hot transition into airstreams 320, 325A, or 325B. When acoustic wave 205A exits airstreams 320, 325A, or 325B, it encounters thermal gradient ∇Ttrans oriented transverse to the travel direction of acoustic wave 205A. Because of this thermal gradient, acoustic wave 205A is diverted further in the same angular direction when it exits airstream 320 as when it entered airstream 320, or further in the same direction when it exits airstream 325A or 325B as when it entered airstream 325A or 325B, respectively. Thus, acoustic wave 205A is refracted into two divergent waves 205D and 205E. Some acoustic waves 205B or 205C, after exiting airstream 320, subsequently exit airstreams 325A or 325B and are diverted in the opposite angular direction from the direction they were diverted when entering airstream 320. This counter-diversion is smaller than the sum of the diversion at the cold-to-hot transition into airstream 320 and the diversion at the hot-to-warm transition from airstream 320 into airstream 325A or 325B. Thus, acoustic wave 205A is refracted into two divergent waves 205B and 205C. In this regard, a convex region of hotter gases Thot causes acoustic waves 205 to diverge relative to their original paths 435. Thus, a convex heated airstream comprising hot airstream 320 and adjoining warm (e.g., Twarm) airstreams 325A and 325B produces temperature gradients necessary to refract acoustic waves 205 away from fuselage 170 and away from (e.g., around or divert) aircraft passenger cabin 271.

Figure 4E:
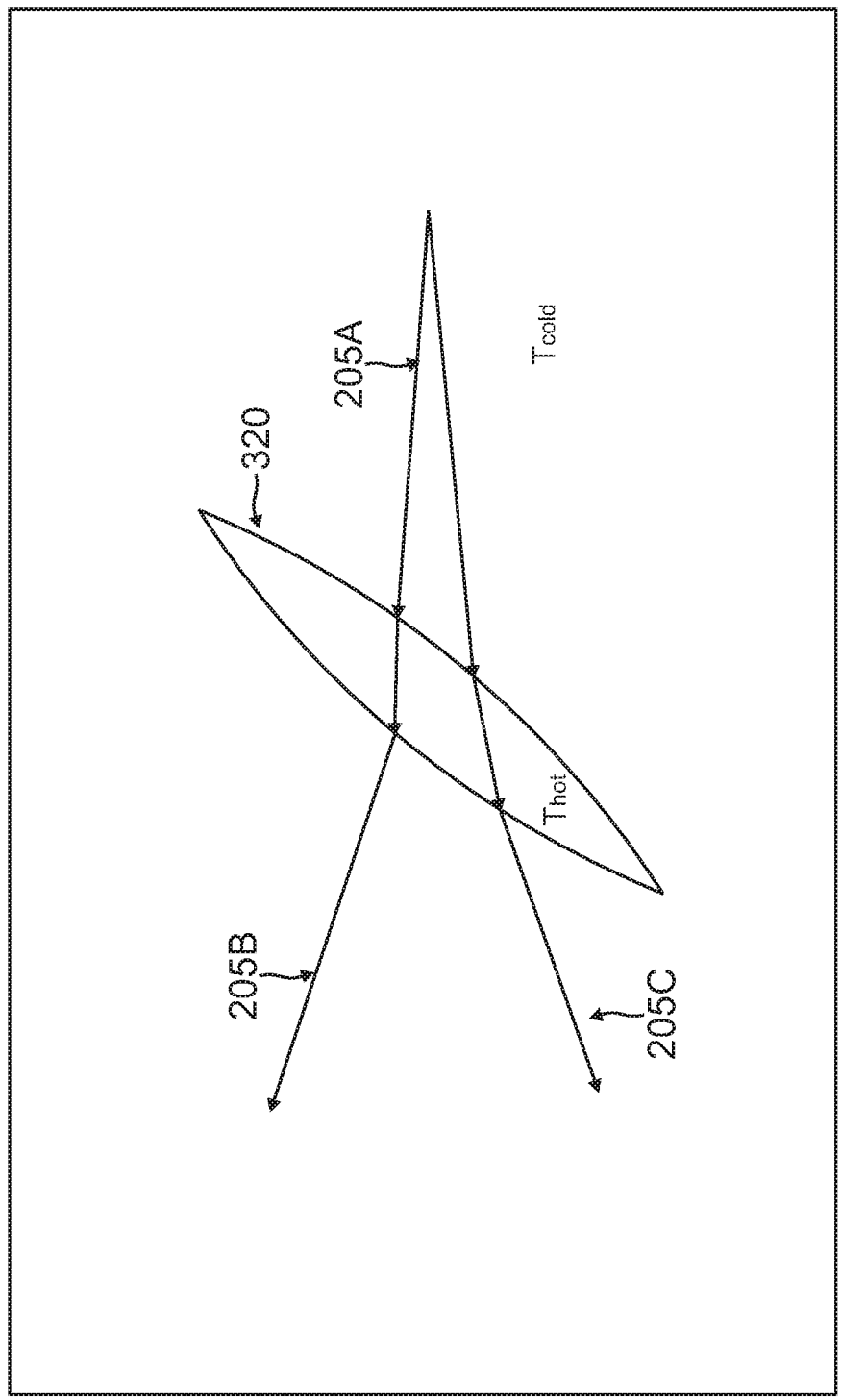

FIGS. 4A-D illustrated acoustic waves 205 entering a heated airstream at near-perpendicular angles. FIG. 4E shows acoustic wave 205A entering convex lenticular heated airstream 320 at an acute angle from a colder temperature region of gases Tcold. As in FIG. 4B, temperature gradients corresponding to the convex lenticular shape of heated airstream 320 (e.g., at temperature Thot) causes acoustic wave 205A to diverge. Thus, acoustic wave 205A is refracted into two divergent waves 205B and 205C.

Figure 4F:
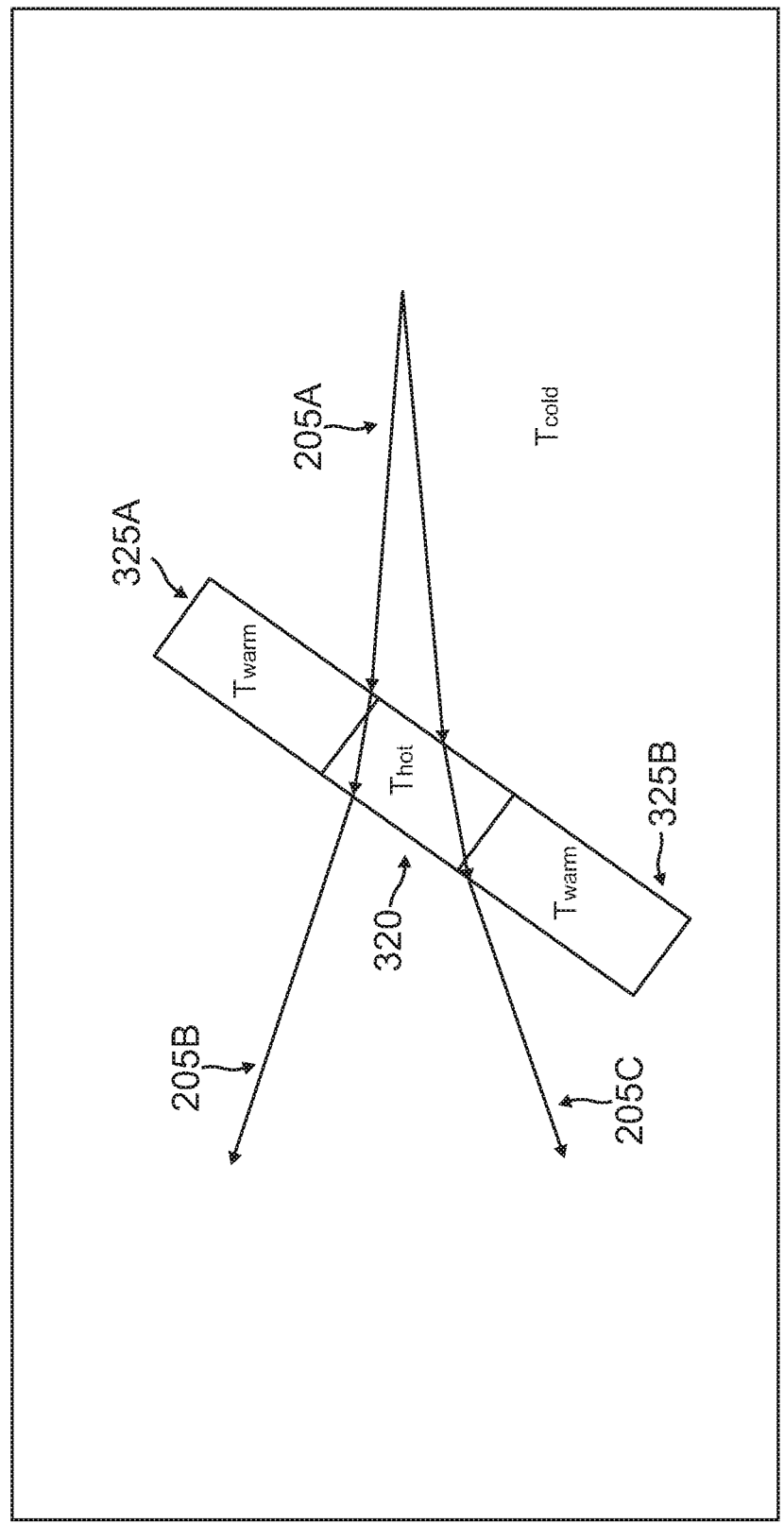

FIG. 4F (not to scale) shows a convex heated airstream 320 comprising hot airstream 320 (e.g. at temperature Thot) and adjoining warm airstreams 325A and 325B (e.g., at temperature Twarm), together with acoustic wave 205A entering the airstream 320 at an acute angle from a colder temperature region of gases Tcold. As in FIG. 4D, temperature gradients corresponding to the convex shape of heated airstream 320 causes acoustic wave 205A to diverge. Thus, acoustic wave 205A is refracted into two divergent waves 205B and 205C.

Figure 5A:
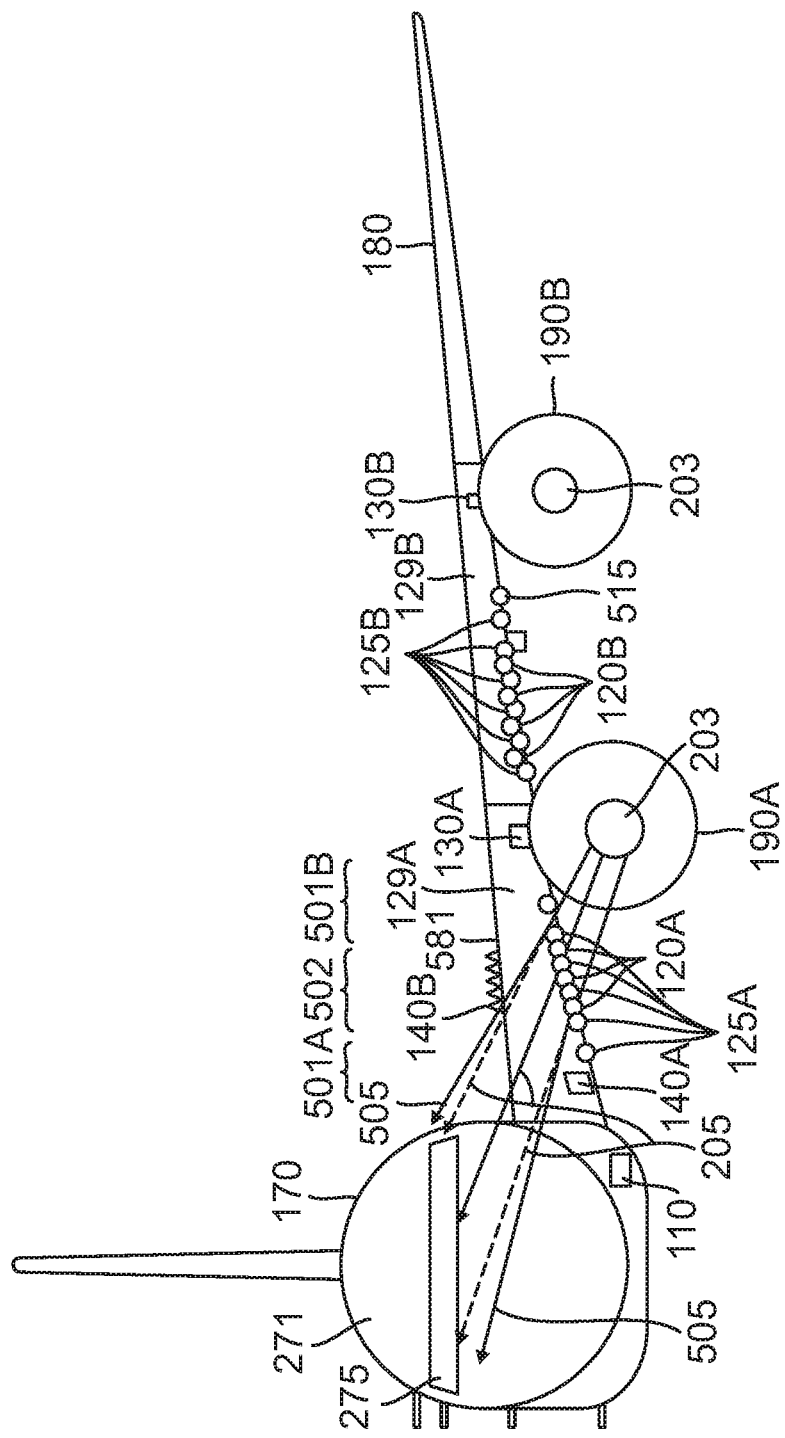
FIGS. 5A-B illustrate refracted acoustic noise waves of aircraft engine high-speed exhaust in accordance with embodiments of the disclosure.
Figure 5B:
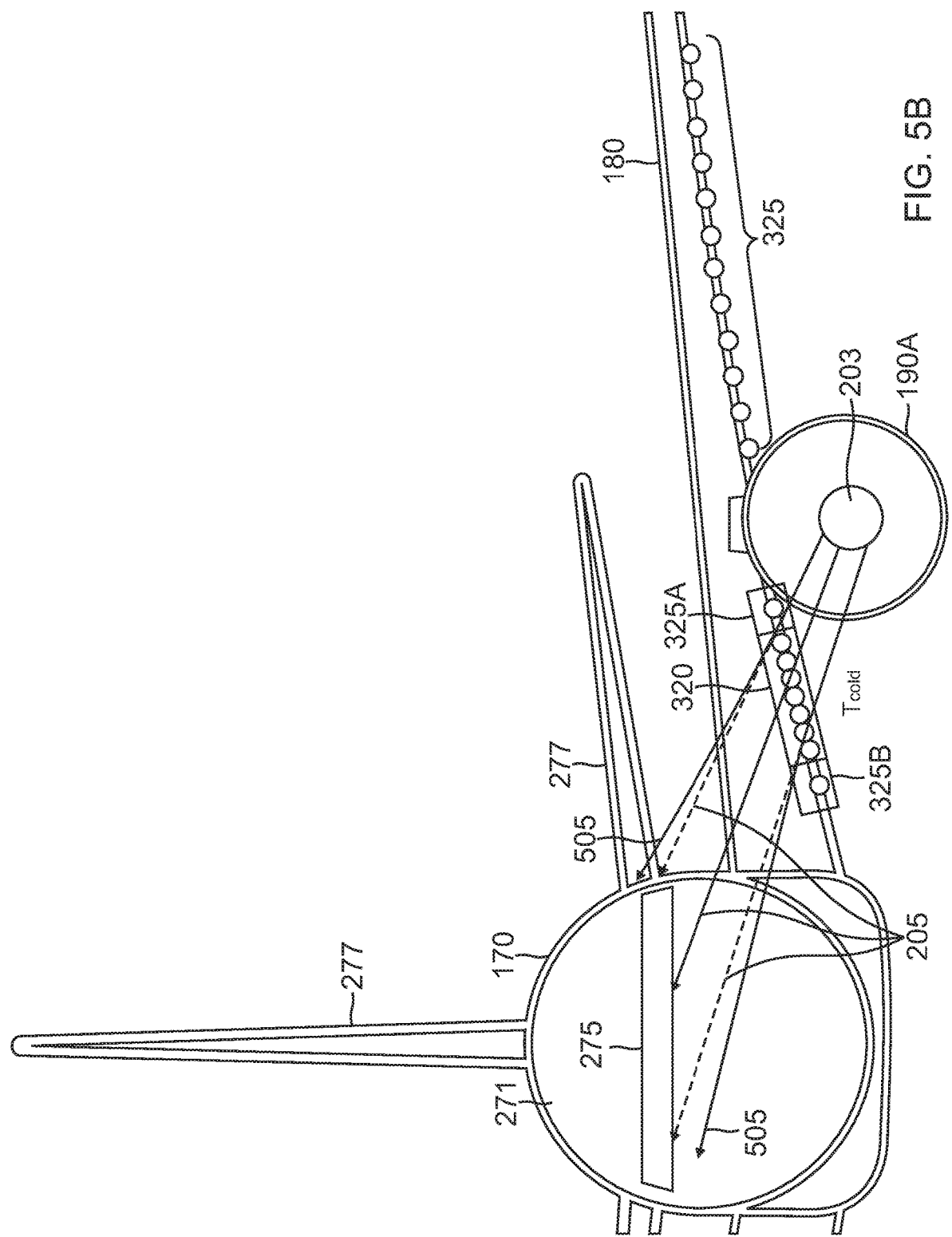

FIGS. 5A-B illustrate refracted acoustic noise waves 505 of engine exhaust high-speed air 203 in accordance with embodiments of the disclosure. In FIGS. 5A-B, rays of non-refracted acoustic waves 205 are compared to rays of refracted acoustic waves 505 to show how a noise level is decreased at passenger ear zone 275. For example, the refracted acoustic waves 505 diverge by an angle approximately seven and seven tenth degrees wider than non-refracted acoustic waves 205. In this regard, intensity of sound within passenger cabin 271 is reduced to approximately seventy percent of its non-refracted value, or a reduction of approximately one and fifty-three hundredths decibels, which is noticeable to a typical human ear.

The estimated noise reduction level above is based on a calculated positive eight degree Kelvin rise in temperature of airstream 320 versus temperature of airstream 325. In this example, an eight degree Kelvin rise in temperature is a result of a calculated two hundred kilowatts of thermal power added to a 25 hundredths square meter of airstream 320, initially at a temperature of two hundred fifty Kelvin and traveling at two hundred meters per second.

The embodiment shown in FIG. 5A illustrates first ports 120A distributed along wing 180 between engine 190A and fuselage 170 and coupled to interior chamber 129A. FIG. 5A illustrates second ports 125A distributed along wing 180 between engine 190A and fuselage 170. First ports 120A distributed along a central portion 502 of wing 180 produce airstream 320 and second ports 125A distributed along outer portions 501A and 501B of wing 180 produce airstreams 325. FIG. 5B illustrates acoustic noise waves 505 refracted by airstreams 320 and 325 aligned aftward of ports 120A and 125A, respectively.

Noise reduction system 100 may be implemented with various embodiments of first ports 120 and second ports 125 including size and quantity of ports. For example, ports 120A and ports 125A are successively distributed along wing 180 between engine 190A and fuselage 170. In some embodiments, an opening of ports 120A is greater than an opening of ports 125A to provide for a greater density of airstream 320 compared to airstream 325. In some embodiments, a quantity of ports 120A is greater than a quantity of ports 125A.

In some embodiments, aircraft 160 includes an additional engine 190B on wing 180, and first ports 120B and second ports 125B are of a size and position between second engine 190B and fuselage 170 in a manner similar to that of ports 120A and 125A between first engine 190A and fuselage 170, as discussed herein. In various embodiments, first ports 120 (labeled 120A and 120B) and second ports 125 (labeled 125A and 125B) are selectively located on a top and/or a bottom surface of wing 180.

In some embodiments, interior chambers 129A and 129B receive bleed air from engine 190A and 190B, respectively. Controller 110 opens and closes valve 130A to selectively route bleed air from engine 190A to interior chamber 129A. Similarly, controller 110 opens and closes valve 130B to selectively route bleed air from engine 190B to interior chamber 129B. In other embodiments, first ports 120 and/or second ports 125 are selectively blocked to control a discharge of air. In this regard, controller 110 operatively opens and closes a cover 515 attached to an opening of ports 120 and/or ports 125 to selectively discharge air.

In some embodiments, as shown in FIG. 5A, interior chamber 129A receives heated air from heater 140A. Controller 110 is electrically coupled to heater 140A to control an operation of heater 140A. Controller 110 turns on and turns off heater 140A and selectively controls a temperature of heated air by adjusting output power wattage of heater 140A.

In some embodiments, heater 140 is configured as an electrical heating blanket 140B that is bonded to a surface of a leading edge 581 of wing 180 at central portion 502 of wing 180. In some embodiments, heating blanket 140B is any type of multi-layered material including an electrically conductive inner layer bonded between layers of insulated material, for example. Other embodiments of heater 140 for purposes of heating leading edge 581 are possible. Controller 110 selectively turns on and turns off heating blanket 140B. Controller 110 selectively controls a temperature of heating blanket 140B by adjusting its output power wattage. In this regard, air heated by leading edge 581 passes over an upper and/or a lower surface at central portion 502 of wing 180 to form heated air airstream 320.

FIG. 6 illustrates a flow diagram describing a method for using an aircraft cabin noise reduction system 100 in accordance with an embodiment of the disclosure.

In block 602, one or more aircraft engines 190 produce a stream of exhaust high-speed air 203 during flight operation. The stream of high-speed air 203 flows past slower moving air causing a disturbance that produces acoustic noise waves 205. Acoustic noise waves 205 travels in a path perpendicular to fuselage 170 toward a passenger cabin 271 of aircraft 160.

In block 604, in some embodiments, heated air is formed by bleed air from aircraft engine 190 and routed within an interior chamber 129 of a wing 180. One or more valves 130 are mechanically coupled between engine 190 and interior chamber 129 to control a flow of heated air to interior chamber 129. A controller 110 is electrically coupled to the one or more valves 130 to open and close valves 130. In this regard, controller 110 controls movement of heated air into interior chamber 129.

In other embodiments, heated air is formed by the operation of a heater 140 mounted within interior chamber 129. Controller 110 controls a temperature of heated air produced by heater 140 by operationally turning on and off heater 140 and/or adjusting heater output power wattage.

In yet another embodiment, a leading edge 181 of wing 180 is heated by a heater 140, configured as a heating blanket bonded to leading edge 581. Ambient air is heated as it contacts an exterior surface of heated leading edge 581 to produce a stream of heated air. Controller 110 selectively turns on and turns off heating blanket 140 to selectively control a temperature of heating blanket 140. Controller selectively adjusts blanket 140 output power wattage. Referring to block 606, heated air formed at heated leading edge 581 passes over an upper and/or a lower surface at a central portion 502 of wing 180 to form airstream 320.

In some embodiments, a plurality of first ports 120 are selectively distributed along a central portion 502 of wing 180 extending between a fuselage 170 and engine 190. First ports 120 are coupled to interior chamber 129 and discharge heated bleed air (e.g., bleed air generated by engine 190) at a first temperature and/or a first density. In some embodiments, first ports vary in size and/or quantity along central portion 502 of wing 180.

Furthermore, a plurality of second ports 125 are selectively distributed along outer portions 501A and 501B of wing 180 extending between fuselage 170 and engine 190. Second ports 125 discharge air at a second temperature and/or a second density that is less than first temperature and/or first density. In some embodiments, second ports vary in quantity along outer portions 501A and 501B of wing 180. In some embodiments, an opening of second ports 125 is smaller than an opening of first ports 120.

In block 606, in some embodiments, discharged heated air from first ports 120 form airstream 320 and discharged air from second ports 125 forms airstreams 325A and/or 325B. Airstream 320 provides a convex airstream of heated air where a temperature is greater than a temperature of airstreams 325A and 325B.

Airstreams 320, 325A, and 325B travel in a path toward the rear of aircraft 160 that is parallel to fuselage 170, and between engine 190 and fuselage 170. A shape of combined airstreams 325A, 320, and 325B form a composite airstream where airstream 320 forms a central portion and airstreams 325A and 325B form outer portions. The combined airstream is hotter in the central portion 502 than at outer portions 501A and 501B to create a convex heated airstream comprising hot airstream 320 and adjoining warm airstreams 325A and 325B.

In block 608, acoustic noise waves 205 traveling toward passenger cabin 271 of aircraft 160 encounter combined airstreams 325A, 320, and 325B. As acoustics noise waves 205 travel through the combined airstream, they reach the region of hotter air (e.g., airstream 320). The hotter air of airstream 320 cause acoustic noise waves 205 to refract away from passenger cabin 271 resulting in a decrease in intensity of noise level in passenger cabin 271. Thus, a convex heated airstream comprising hot airstream 320 and adjoining warm airstreams 325A and 325B produces temperature gradients necessary to refract acoustic waves 205 away from fuselage 170 and away from (e.g., around or divert) aircraft passenger cabin 271 at a passenger ear zone 275.

Advantageously, aircraft cabin noise reduction system 100 is implemented to reduce noise levels in an aircraft. By refracting acoustic noise waves away from the fuselage, acoustic loads on mechanical systems at the aft portion of the aircraft are also reduced.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   heating air to provide a first stream of air from a central portion of a wing segment of a wing extending between a fuselage and a first engine of an aircraft; and
   wherein the first stream of air is at a higher temperature than an adjacent stream of air from the wing, the adjacent stream of air traveling in an aft direction between the first stream of air and an exhaust stream of air from the first engine;
   wherein at least one of (a) and (b) is true:
   (a) the heating the air comprises heating a leading exterior surface of the wing at the central portion of the wing segment to provide the first stream of air;
   (b) the heating the air comprises using bleed air from the first engine to provide the first stream of air, and wherein the aircraft does not have an engine between the first engine and the fuselage.

2. The method of claim 1, wherein the first stream of air travels from the wing in an aft direction in a path parallel to the fuselage to form a heated air temperature gradient between the exhaust stream of air and the fuselage.

3. The method of claim 1, wherein (a) is true.

4. The method of claim 1, wherein (b) is true.

5. The method of claim 4, further comprising:
   receiving the bleed air from the first engine; and
   routing the bleed air to provide the first stream of air.

6. The method of claim 5, further comprising discharging the first stream of air through a plurality of first ports selectively distributed along the central portion of the wing segment between the fuselage and the first engine, wherein the first ports are configured to discharge the first stream of air at a top and/or a bottom surface of the wing.

7. The method of claim 6, further comprising discharging the adjacent stream of air through a plurality of second ports selectively distributed along one or more outer portions of the wing segment between the fuselage and the first engine, wherein the second ports are configured to discharge the adjacent stream of air at the top and/or the bottom surface of the wing.

8. The method of claim 7, wherein a quantity of the first ports is greater than a quantity of the second ports, and/or wherein an opening of the first ports is greater than an opening of the second ports.

9. The method of claim 1, further comprising refracting an acoustic wave caused by the engine and an engine exhaust stream of air away from the fuselage by the first stream of air.

10. The method of claim 1, further comprising heating air to provide a second stream of air from a central portion of a second wing segment of the wing extending between the first engine and a second engine of the aircraft.

11. An aircraft comprising:
    a fuselage;
    a wing coupled to the fuselage and configured to heat air to provide a first stream of air from a central portion of a wing segment of the wing extending between the fuselage and a first engine of the aircraft; and
    wherein the first stream of air is at a higher temperature than an adjacent stream of air from the wing, the adjacent stream of air traveling in an aft direction between the first stream of air and an exhaust stream of air from the first engine;
    wherein at least one of (a) and (b) is true:
    (a) the aircraft comprises one or more heaters coupled to a leading exterior surface of the wing and configured to heat the leading exterior surface at the central portion of the wing segment;
    (b) the first engine is configured to provide bleed air to an interior chamber of the wing, and wherein the aircraft does not have an engine between the first engine and the fuselage.

12. The aircraft of claim 11, wherein the first stream of air travels from the wing in an aft direction in a path parallel to the fuselage to form a heated air temperature gradient between the exhaust stream of air and the fuselage.

13. The aircraft of claim 11, wherein (a) is true.

14. The aircraft of claim 13, further comprising a heater controller coupled to the one or more heaters and configured to turn on and/or turn off the one or more heaters to selectively control a temperature of the leading exterior surface of the wing.

15. The aircraft of claim 11, wherein (b) is true.

16. The aircraft of claim 15, further comprising:
    one or more valves coupled between the first engine and the interior chamber; and
    a valve controller coupled to the one or more valves configured to open and/or close the valves to selectively route the bleed air to the interior chamber.

17. The aircraft of claim 15, further comprising:
    a plurality of first ports coupled to the interior chamber of the wing and selectively distributed along the central portion of the wing segment extending between the fuselage and the first engine, wherein the first ports are configured to discharge the first stream of air at a top and/or a bottom surface of the wing.

18. The aircraft of claim 17, further comprising:
    a plurality of second ports selectively distributed along at least one outer portion of the wing segment extending between the fuselage and the first engine, wherein the second ports are configured to discharge the adjacent stream of air at the top and/or the bottom surface of the wing, wherein a quantity of the first ports is greater than a quantity of the second ports, and/or wherein an opening of the first ports is greater than an opening of the second ports.

19. The aircraft of claim 11, further comprising an acoustic wave caused by the first engine and an engine exhaust stream of air that travels in a direction toward the fuselage, wherein the acoustic wave is refracted away from the fuselage by the first stream of air.

20. The aircraft of claim 11, further comprising a second engine coupled to the wing, wherein the wing is configured to heat air to provide a second stream of air from a central portion of a second wing segment of the wing extending between the first engine and the second engine of the aircraft; and
    wherein the second stream of air is at a higher temperature than a second adjacent stream of air from the wing.

* * * * *